3,290,790
METHOD OF DRYING A HYDROGEL
Daizo Kunii, Bunkyo-ku, Tokyo, Yujiro Sugahara, Tsuruoka-shi, Yamagata-ken, Kiyoshi Sato, Oaza Nishime, Tsuruoka-shi, Yamagata-ken, Masaji Saito, Kitakanbara-gun, Niigata-ken, and Masahide Ogawa, Musashino-shi, Tokyo, Japan, assignors to Mizusawa Kagaku Kogyo Kabushiki Kaisha, Higashi-ku, Osaka, Japan, a corporation of Japan
Filed Mar. 23, 1964, Ser. No. 353,780
Claims priority, application Japan, Apr. 2, 1963, 38/16,244
4 Claims. (Cl. 34—9)

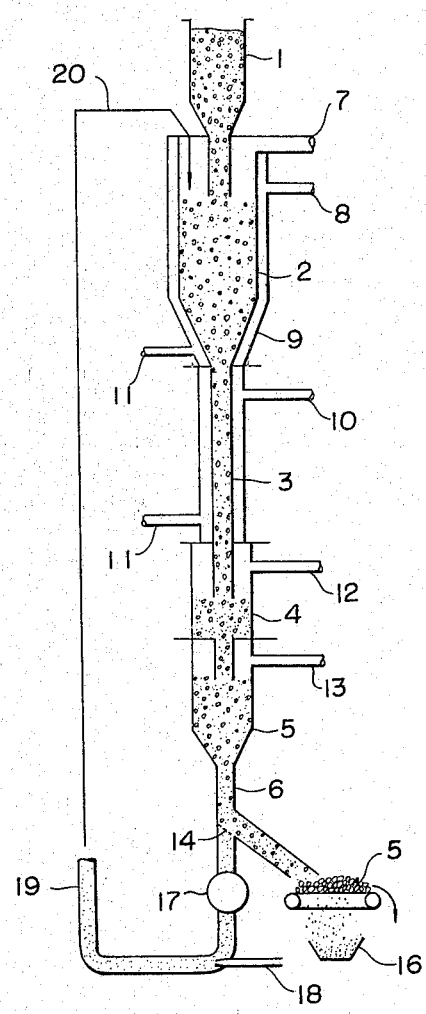

This invention relates to a method of drying hydrogels. More particularly, this invention relates to a method of drying hydrogels characterized in that said hydrogels are heated together with porous particles, the average apparent specific gravity and average diameter of which are smaller than the average apparent specific gravity and average particle diameter of the dried gel.

In the known method of drying hydrogels containing more than 90 percent of water such as silicahydrogel, aluminahydrogel and silicaalumina hydrogel, on account of the hydrogel's volume being 20 times as large as that in dried condition, much labor and sizable equipment have been required. Furthermore, in the conventional methods, more than 10 to 30 percent of the product was either cracked or damaged resulting in low yield rate. Accordingly a solution to the drying method has been a critical problem from the standpoint of thermal efficiency, labor consumption and yield rate of products, without any satisfactory method having been found heretofor.

In particular, extreme difficulties have been encountered in drying spherical hydrogels, wherein they were dried at 110° C. or higher for 30 to 40 hours. This is because when said gels were dried while flowing the air according to the general principle for the drying, cracking or destruction occurred nearly on all gels, and therefore it was necessary to dry said gels in such condition that the steam leaks out slightly, without permitting air going in the dryer. More particularly the hydrogels were readily cracked or destructed upon contact with the air after removal thereof from the dryer when said hydrogels had been dried incompletely or unevenly, and accordingly, an unnecessarily long time was required for the drying.

In addition, the spherical hydrogels are fragile spherical substances which crack easily with a small amount of impact or break up with slight pressure. Further, said spherical gels are apt to stick to each other during the drying process and also thermal conduction among the spherical gels is excessively poor during said process. Syneresis fluid is discharged from the hydrogels as said gels shrink when heated, and silica or alumina contained in said fluid binds the spherical gels together, as a result of which the gels, for example, stick to the wall surface of the cylindrical drying tower forming a mass of gels without dropping downward, thus presenting a cause of uneven drying.

The hydrogels having such characteristics as described above, when the gel spheres are dried in, for example, a glass tube, some spheres shrink to small while some shrink little on account of the interspace among them. This presents a strong tendency of uneven drying which is a cause of cracking.

In contrast with the above, the inventors of this invention have successfully discovered that crack free dried gels can be produced industrially easily by heating said hard-handling and easy-cracking hydrogels together with porous particles, the average apparent specific gravity of which is small than the average apparent specific gravity of the dried hydrogels finally obtained after drying and the average particle diameter of which is smaller than that of said dried hydrogels.

Fluidization is the suspension or fluidization of small solid particles in a vertically rising stream of gas so that gas and solid come into intimate contact. In the art of fluidization, the term apparent specific gravity refers to the specific gravity of a bed of particulate matter at the point in time after it has been established and before any fluidization has occurred. After such a bed is subject to fluidization, or any mechanical disturbance, and is allowed to settle, the specific gravity is less than the originally measured "apparent" specific gravity. Those porous particles usable for this invention include fine spherical powders or particles such as terra abla, activated clay, alumina kaolin. Of course these powders or particles must not be reactive with the hydrogels. Accordingly, any porous particles which are not reactive with said hydrogels at the drying temperature can be employed for the practice of this invention. Exemplary hydrogels include, for example, silica-hydrogel, alumina-hydrogel and silica-alumina-hydrogel, but this invention is applicable for drying of any easy-cracking hydrogels.

The hydrogels used for this invention signifies those wet with water but are not limited thereto. Those wet with a mixture of water and organic solvents or others are also included.

The heating in this invention can be carried out at any temperature ranging from the lowest temperature which is high enough to evaporate the water or other organic solvents contained in the hydrogels to such high temperature as not to cause objectionable deterioration of said gels.

However it is not recommended for this invention to expose said hydrogels suddenly to a high temperature without the presence of sufficient amount of aqueous vapor because this practice tends to cause cracking. Therefore the heating preferably starts generally from 50° C. or a temperature below thereof, with a raising of the temperature gradually along with the temperature rise of the hydrogels. In this case, however, it has been revealed that when humidity inside of the drying chamber is 80% or higher, the hydrogels usually do not crack if said gels are suddenly exposed to a high temperature of 100° C. or higher, thereby shortening the drying time.

Highest temperature for the heating is not always the same but depends on the composition, characteristics, or boiling point of the wetting solution of the hydrogel to be dried; however, hydrogels wet with water, at the stage of near completion of the drying process, can be exposed usually to a temperature of 200° C. or higher. Alumina-gel in particular can be exposed to a temperature as high as about 600° C. while for silica-gel and silica-alumina-gel, it is preferable not to raise the temperature over the maximum 250° C. in order to avoid undesirable deterioration thereof.

This invention may be carried out, for instance, as follows: Said hydrogels and porous particles are fed at the top of a drying tower the interior of which is filled with aqueous vapor generated from the hydrogels and/or other vapor generating sources, caused to pass therethrough to the bottom in such state that the hydrogels are mixed with the porous particles, and removed from the drying tower at its bottom in an appropriate quantity with the subsequent separation of the dried hydrogels from the porous particles.

According to the invention, the hydrogels can be dried as described above, and calcination can be effected simultaneously in the same drying chamber, as desired, by further raising the temperature following said drying process.

The reason for using porous particles in the invention, which average apparent specific gravity and the average diameter of the particles are smaller than those of dried hydrogels respectively is to avoid destruction of the hydrogels possibly caused by excessively heavy weight of the porous particles, uneven heat distribution in the hydrogels as well as in the drying tower possibly resulted from the particles diameters being excessively large or uneven aqueous vapor distribution among the hydrogels resulting in a tendency of the hydrogels being cracked. As can be seen in the above, it is preferable for this invention to select particle size and drying method so that the porous particles may flow through the interspaces among said porous particles. In view of the above, porous particles of 10 to 200 mesh, preferably 50–200 mesh, is used in this invention. It is also advantageous, according to the invention, to use smaller size porous particles for a higher drying temperature of a hydrogel. In this respect, particles of a size above 50 mesh are particularly preferred.

Now the drying process of alumina-hydrogel and silica-hydrogel practicing this invention is described more specifically.

While the spherical alumina-hydrogel is normally fragile and very weak against friction pressure, the surface of the gel is somewhat hardened, thereby facilitating easier handling when added with powder particles, such as activated clay powder. On the other hand, in the instance of silicagel, powdered activated clay into which the gel is thrown closely covers up the surface of the gel. Since the surface of the sphere is relatively hard, as compared with the alumina, excessively fast adsorption of the moisture from the surface sometimes causes a great difference in hardness on the surface as compared with the interior. This precipitates cracks. Accordingly it is advantageous in this case to use either powder or small particles of activated clay, the size of which is 50 to 150 mesh. With such particles possible cracking is avoided while the surface hardness is somewhat increased, facilitating handling of the gel. It is also practical in this instance to use the activated clay powder with its adsorbing efficiency previously lessened by causing said powder to adsorb water in advance.

This process excludes the objectionable possibilities completely that the hydrogels adhere to the equipment wall or that the spheres ar combined together due to the gel in the syneresis yielded during the drying or that said syneresis when contacting the dried gels causes cracking because said syneresis is absorbed by the powdered or granular substance which covers the spheres.

The presence of said powdered or granular substance also avoids a problem of uneven drying resulting from inefficient thermal conductivity of the spherical hydrogels. Namely, for example, when the spherical hydrogels are placed in a glass tube, followed by injection of granular substance, for example, fine spherical alumina (of more or less 120 mesh), the interspaces among the gels are filled up with the fine spherical alumina. Upon drying thereof by heating from the exterior, the aqueous vapor generated from the spherical hydrogels is first absorbed by said alumina and then the vapor in excess to the saturated humidity flows toward the top of the tube being accompanied by the spherical alumina, thereby causing a sort of flow. In other words, said fine spherical alumina move upwardly along the wall surface just like a water flow and go downward from the central portion, thus forming a sort of a fluidized bed in the interspace between the hydrogels.

Hence, the fluidized bed provides conductive body continuously flowing between the particles, as a result of which said spherical hydrogels as a whole are dried evenly.

The same boiling phenomenon occurs when acid clay fine powder is used. In this case, however, while excessively fine powder thereof goes out with aqueous vapor, a large part of the powder flows along the surfaces of the spheres, acting as a thermal conductive body and enables said spheres to be dried evenly.

Now referring to the control of the aqueous vapor atmosphere over the sphere surface, which is the most critical of all, it is extremely difficult to maintain the water content of the heated air being in contact with the sphere surface in the optimum condition throughout the drying process of the spherical hydrogels. To maintain the condition, the amount of aqueous vapor in the heated air must be reduced gradually as the process proceeds, because an excessive vapor will not accomplish the drying.

Therefore, if the amount of aqueous vapor outgoing from the gel interior is nearly balanced with that evaporating from the gel surface, the resultant shrinkages of the interior and exterior of the sphere caused by drying thereof is kept in an equilibrium, thereby preventing the sphere from cracking. It is natural that the amount of aqueous vapor generated from a hydrogel containing 90% of water varies greatly from that from a gel that has been processed for drying with only 5% of water remained therein. The most outstanding feature of the present invention, therefore, exists in that maintenance in the optimum condition of the momentarily varying amount of aqueous vapor contained in the heated air surrounding the spherical hydrogel's surface has been made possible by covering said surface with a powdered or granular substance.

To describe the process in further detail, when the spherical hydrogel is heated with a powdered or granular substance being present on its exterior, the aqueous vapor generated from the sphere is first adsorbed by the powdered or granular substance or otherwise retained by said substance, and the rest is released as vapor. As the drying of the gel proceeds, the powdered or granular substance is naturally dried as well, and thus aqueous vapor is released by the substance as the drying thereof proceeds, which vapor acts to regulate the aqueous vapor atmosphere of the heated air around the surface of the sphere. Further, the volume of the powdered or granular substance does not shrink by the heat drying whereas that of the hydrogel shrinks nearly to its 1/20 having 20% of water content. Therefore, for example, the initial 1 to 1 ratio of the hydrogel to the powdered or granular substance added thereto varies to 1 to 10 or 20 as the drying proceeds, and as such, the substance performs the aqueous vapor atmosphere regulating function more efficiently.

For example, when the water content in the gel was reduced to 20%, the volume of the gel becomes 1/20, and as a result, the gel is covered by much powdered or granular substance which contains nearly as same amount of water as the powdered or granular substance containing 20% of water. As the water content of the gel is further reduced to 5%, that of said powdered or granular substance gets down to an approximately equal level, and as such said substance dries while releasing the water at the same rate as that of the gel during the drying process. As above, the powdered or granular substance adjusts the aqueous vapor atmosphere in the heated air in such a manner as to balance the vapor amount evaporating from the sphere surface with that which is going toward the surface from the interior, and this is presumed to be a reason for preventing cracking. When the water content of the hydrogel being dried reaches 1%, the powdered and granular substances in its exterior also dries to the same extent and thus the sphere surface is always supplied with water in the amount required by the powdered or granular substance until completion of the drying.

The function of the powdered or granular substance is only to hold the water in the necessary amount, which is released by the gel, and also to release thereof in the necessary amount. Therefore it does not lower thermal efficiency at all.

Any powdered or granular substance which is capable of holding aqueous vapor therein such as pumice powder or a granule thereof, or substance, the granule of which has absorption capability in itself, such as acid clay, activated clay or finished alumina-gel, may be used for this invention. In this instance, said pumice powder or granule, kaoline and acid clay can be used as they are, while such powdered or granular substances as the activated clay and alumina-gel, which are of absorption type, are preferably used after causing them to absorb a certain amount of water in advance in order to prevent the spherical gel surface from being dried abruptly. The use of powdered or granular substance is normally determined depending on the method of drying. For example, in the case of tower type drying, any substance so long as its weight and configuration do not damage the gel, such as, for example, activated clay having been moulded into about 3 mm. long column, spherical alumina-gel of about 3 mm. in length or smashed pumice granule of the same size, is usable.

In this invention, the aforesaid problems have been solved by heating the hydrogel with the powdered or granular substance co-existing; however when this invention is carried out in a tower-type continuous operation, it is highly advantageous industrially to fill the interspace among the gel granules with the powdered or granular substance.

The accompanying drawing shows a vertical continuous drying tower suitable for the practice of this invention. The instance of practicing the method of this invention with the use of this apparatus will be described below with reference to the drawing. Gel-like spheres, for example, finished spherical alumina-gel or activated clay, etc., having been mixed uniformly in advance are fed into the drying tower 2 through a hopper 1. It is usually preferable to use a powdered or granular substance of 10 to 150 mesh normally in an appropriate rate of more than 0.3 part per 1 part of the gel by weight. An intensive evaporation from the gel-like granular material occurs when heated through a metal plate or mixed with the heated powdered or granular substance circulating from a circulation tube 20 toward the top of the tower and the vapor generated while ascending is accompanied by or mixed with the fine powdered or granular substance, thereby causing intensive motions of said substance in the interspaces among the gel-like granules to carry the heat. As can be seen in the above, the fine powdered or granular substance acts as an medium for heating, thereby effecting the tower interior being heated evenly. As previously stated, the surface of the gel-like granule is very vulnerable but according to the method of this invention, the powdered or granular substance is prevented from friction or collision with the tower wall surface or other granules owing to the intervention of the powdery or granular substance and hence the possible damage or destruction thereof is eliminated. The gel-like granules, a large part of water of which has been vaporized in the drying tower 2 then enter into a dry finishing tower 3, where they are subjected to the heat through the metal plate or the heat of the powdered or granular substance dropping through the interspace of the granules, thereby having the free water therein further being evaporated. The gel-like granules, after the residual water has been evaporated, enter into a calcination area 4, where they are fully calcinated by the heated air blown in through and discharged from pipe 12, 13 while maintained at, for example, 140 to 160° C. A mixture of dried granule product and the powdered and granular substance moves to a separation plate 14, passing through the hopper 5 and a pipe 6, where the dried granules are separated and removed continuously by means of a discharging apparatus 15, and the fine powdered or granular substance remaining in the dried granules is further separated into a receptacle 16. On the other hand, the powdered or granular substance descends through the separation plate 14, and while maintained at a predetermined flow rate by means of a powdered or granular substance flow regulator 17, circulated toward the top of the tower 2 through a lift tube 19, thence through the circulation tube 20 being propelled by air or heated gas discharged from a nozzle 18. However, it is apparent that the circulation of the powdered or granular substance is not always necessary in this invention. Whereas a heating source can be either aqueous vapor, heated gas or electric heater, that in the instance of the apparatus shown in the drawing is such as aqueous vapor or heated gas which is sent from 8 and 11, and discharged from 11. It is also possible to compress the aqueous vapor discharged from 7 by means of an aqueous vapor blower or the like to raise the temperature and send the same from 8 and 10.

As described hereinbefore the invention makes it possible to effect drying of the hydrogels industrially in a short period of time without cracking or destruction thereof. Furthermore, by this invention more uniform products and products excelling in adsorpting efficiency are obtained.

The present invention is further explained by the examples below.

EXAMPLE 1

In this example, comparisons were made between the conventional shelf-type drying and the tower-type drying according to this invention with respect to drying rate, destruction rate, strength against compression and A.A.I.

As an apparatus for the tower-type drying, a straight glass tube, 30 cm. in diameter and 760 cm. in length, surrounded by a liquid paraffin bath to be heated by a nicrome wire was used to dry a test material placed therein. In detail, while maintaining the bath temperature at 140° C., spherical hydrogels were fed in the tube from the top together with a porous or granular substance in a mixture ratio of 1:1, with the subsequent supply thereof in the amount equal to the volume reduced in the drying process. The dried gels mixed with said porous or granular substance were removed from the bottom. The dried gels were further calcinated, at 200° C. for 30 minutes for silica-gel and at 550° C. for 3 hours for alumina-gel, subsequent to which the destruction rate strength against compression and A.A.I. (moisture adsorption efficiency) were measured. The experimentation results from the above are shown in No. 1 and No. 2 of Table 2. Herein reference to "mesh" refers to Tyler's mesh size.

NO. 1 OF TABLE 1.—SILICA-GEL DRIED BY TOWER-TYPE DRYING

| Item | Drying Period (hr.) | Destruction Rate (percent) | Strength against Compression (kg.) | A.A.I. |
|---|---|---|---|---|
| Test material: | | | | |
| 1. Spherical silica-gel + kaolin (50-150 mesh) | 7.00 | 1.4 | 112.4 | 75 |
| 2. Product produced by conventional shelf-type drying | 30.00 | 8.0 | 109.8 | 67-72 |
| 3. Product produced by tower-type drying without porous or granular substance | 17.00 | 72.8 | 88.6 | 73 |

NO. 2 OF TABLE 1.—ALUMINA-GEL DRIED BY TOWER-TYPE DRYING

| Item | Drying Period (hr.) | Destruction Rate (percent) | Strength against Compression (kg.) | A.A.I. |
|---|---|---|---|---|
| Test material: | | | | |
| 1. Spherical alumina-gel + kaolin (50-50 mesh) | 6.50 | 1.2 | 109.6 | 39 |
| 2. Product produced by conventional shelf-type drying | 25.00 | 10.9 | 63.6 | 32 |
| 3. Product produced by tower-type drying without porous or granular substance | 17.00 | 23.6 | 78.7 | 39 |

In Nos. 1 and 2 of the above Table 1, Test Materials 1 are those in accordance with this invention, while Test Materials 2 and 3 are for control experiments.

EXAMPLE 2

In this example, a fluidized drying test was conducted by having micro-sphere (M.S.) alumina or activated clay of 50–150 mesh co-existing with spherical hydrogen in the tower-type drying.

In detail, the fluidized drying test was carried out at the bath temperature of 140° C., using the same apparatus as in Example 2 and having sieved 50–150 mesh microsphere (M.S.) alumina co-existing. In this case the flowing activity was performed at about 200 mm. from the top of the tube during the drying process.

The result of the above is shown in No. 1 and No. 2 of Table 2.

NO. 1 OF TABLE 2.—SILICAGEL DRIED BY TOWER-TYPE DRYING

| Item | Drying Period (hr.) | Destruction Rate (percent) | Strength against Compression (kg.) | A.A.I. |
| --- | --- | --- | --- | --- |
| Test material: | | | | |
| Spherical silicagel+ M.S. alumina (50–150 mesh) | 3.00 | 0.7 | 119.4 | 70 |
| Spherical silicagel+ activated clay (50–150 mesh) | 3.00 | 1.2 | 106.4 | 71 |

NO. 2 OF TABLE 2.—ALUMINA GEL DRIED BY TOWER-TYPE FLUIDIZED DRYING

| Item | Drying Period (hr.) | Destruction Rate (percent) | Strength against Compression (kg.) | A.A.I. |
| --- | --- | --- | --- | --- |
| Test material: | | | | |
| Spherical aluminagel+ M.S. alumina (50–150 mesh) | 3.5 | 4.1 | 97.6 | 40 |
| Spherical aluminagel+ activated clay (50–150 mesh) | 4.5 | 2.5 | 101.8 | 39 |

As shown in No. 1 of Table 3 above, in the tower-type fluidized drying of silicagel, the drying time was markedly shortened to 3 to 3.5 hours and particularly the use of M.S. (micro-sphere) alumina provided for the best fluidity, thereby shortening the drying time to 3 hours. The other figures for destruction rate, strength against compression and A.A.I. all show good results as compared with those for the conventional shelf-type drying, similar the case of the tower-type drying in Example 2.

Also the tower-type fluidized drying of alumina-gel produced similar results as in the case of silica-gel, that is, the drying time was shortened to 3.5 hours and the one tried with M.S. alumina coexisting therein produced the most efficient results. The figures for the destruction rate, strength against compression and A.A.I. were similar to those in the case of Example 3.

Further both silica-gel and alumina-gel were fluidized 135° C. or a higher temperature but the best temperature was 140° C. from the standpoint of the quality and others of the products. The flow occurred at ¼ of the length of the tower from the top, where water of not less than ½ of the total to be evaporated was released and its residence time was from 40 to 60 minutes. This indicated the thermal efficiency at the flowing section to be extremely high.

EXAMPLE 5

In Examples 2 and 3, a drying time of spherical hydrogel dried by a tower-type drying together with a powdery or granular substance was illustrated to be shortened. However, in practice, the dried product was further subjected to a calcination process, making the drying and calcination normally two step operation.

In this example, said two operations were carried out in same apparatus, quickly and successively producing crack-free and evenly dried spheres. The apparatus for this experimentation was a drying-calcination tower comprising a stainless tube (14 mm. in diameter) having the top 60 cm. portion thereof being surrounded by a fluidized paraffin bath to be heated by a Nichrome wire, thereby constituting a drying section. Further another section of said tube, in the height of 35 cm. and spaced by 5 cm. from the aforesaid drying section downwardly, was surrounded by Handa bath to provide a calcination section having a table feeder below thereof. The section of 5 cm. in height interspaced between the drying section and calcination section was provided with a hole of 1 mm. in diameter at 6 places. With such apparatus, spherical hydrogels and granular activated clay (20–35 mesh sieved product) coexisting therewith in the ratio of 1:1 were fed in at its top, with the subsequent supply of the same in the amount to fill the volume reduced in the process of drying. The dried material was further calcinated in the Handa bath calcination tower below the drying section and subsequently removed together with the powdered or granular substance by a table feeder for removal. In this instance, the temperature of the paraffin bath at the upper portion was 120 to 130° C. while that of the Handa bath at the lower portion was 230 to 250° C. and the rate of the gels destructed after 17 hours continuous operation was no more than 1%. As such, with the granular activated clay coexisting, the hydrogels were dried and calcinated under a highly stabilized condition, removed smoothly with less cracking and thus the experimentation was carried out satisfactorily.

The highest efficiency as to rate of destruction attained in this experimentation can presumably be attributed to the fact that the hydrogel was dried and calcinated successively in the same apparatus. This thereby avoids a phenomenon that the hydrogel not having been dried sufficiently in a tower crack readily upon removal from a drying tower and exposure to the open air as could occur when the tower serves drying only of the hydrogel.

EXAMPLE 4

In this example, both tower-type drying and shelf-type drying were conducted of hydrogel in the state of destruction with a powdered or granular substance coexisting to see how much the hydrogels were prevented from becoming fine granules and also how much the drying time was shortened as a result of the drying.

For the tower-type drying, an apparatus the same as in Example 2 was employed and the drying was carried out at 140° C. The test gels were spherical articles destructed to ½ size, in which granular activated clay or M.S. alumina were coexisting in the ratio of 1:1. The shelf-type drying was conducted in the manner same as in Example 1.

The test results are shown in No. 1 and No. 2 of Table 3.

NO. 1 OF TABLE 3.—SHELF-TYPE DRYING OF DESTRUCTED SILICA-GEL

Destruction rate (percent)
With activated clay co-existed (150–200 mesh) -- 3.15
With kaolin co-existed (150–200 mesh) -------- 2.34
With no powdery or granular substance co-existed _ 16.91

NO. 2 OF TABLE 3.—TOWER-TYPE DRYING OF DESTRUCTED SILICA-GEL

Destruction rate (percent)
With M.S. alumina co-existed (50–100 mesh) ____ 6.64
With activated clay co-existed (50–100 mesh) ___ 1.05
With no powdery or granular substance co-existed _ ____

What is claimed is:
1. A method of drying hydrogels which comprises feeding a mixture of said hydrogels together with finely divided porous granules having a particle size of 10 to 200 Tyler's mesh wherein the mixture contains hydrogels of a higher average apparent specific gravity and a higher average diameter than said porous granules into a drying tower from its upper part, and heating said hydrogels and said granules from the exterior of said tower whereby aqueous vapors are emitted from the hydrogel surfaces and are absorbed by the porous granules, continuing said heating whereby the aqueous vapors are emitted from the granules to the ambient atmosphere so as to fluidize said finely divided porous granules in the interspaces among said hydrogels by the action of said aqueous vapor evolved from said hydrogels within said tower, and recovering the dried gels together with said granules from the lower part of said tower.

2. A method of drying hydrogels according to claim 1 wherein calcination of said dried hydrogels is carried out in the same drying tower subsequent to the drying.

3. A method according to claim 1 wherein the hydrogel is heated together with said porous granules in an amount at least equal to that of said hydrogel by weight.

4. A method according to claim 1 wherein said hydrogel is heated together with said porous granules at the temperature ranging from 50° to 150° C.

References Cited by the Examiner
UNITED STATES PATENTS

| | | | |
|---|---|---|---|
| 2,423,309 | 7/1947 | Gary | 34—9 X |
| 2,438,450 | 3/1948 | Nelson. | |
| 2,638,684 | 5/1953 | Jukkola | 34—9 |
| 2,846,775 | 8/1958 | Lindsay | 34—10 |

FREDERICK L. MATTESON, Jr., *Primary Examiner.*

D. A. TAMBURRO, *Assistant Examiner.*